US012244768B2

(12) United States Patent
Lew et al.

(10) Patent No.: US 12,244,768 B2
(45) Date of Patent: *Mar. 4, 2025

(54) CALL CENTER MOBILE MESSAGING

(71) Applicant: HeyWire, Inc., San Francisco, CA (US)

(72) Inventors: Eugene Lee Lew, Olney, MD (US);
Vasileios John Gianoukos, Winchester, MA (US); Kenneth Norman Heim, Barrington, IL (US)

(73) Assignee: Salesforce, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/689,302

(22) Filed: Mar. 8, 2022

(65) Prior Publication Data
US 2022/0191328 A1 Jun. 16, 2022

Related U.S. Application Data

(63) Continuation of application No. 17/359,225, filed on Jun. 25, 2021, which is a continuation of application No. 14/453,143, filed on Aug. 6, 2014, now Pat. No. 11,172,067, which is a continuation-in-part of application No. 13/803,331, filed on Mar. 14, 2013, now Pat. No. 9,271,129, which is a continuation-in-part of application No. 13/441,105, filed on Apr. 6, 2012, now abandoned, which is a continuation-in-part of application No. 13/111,109,
(Continued)

(51) Int. Cl.
H04W 4/00 (2018.01)
H04M 3/51 (2006.01)
H04W 4/14 (2009.01)

(52) U.S. Cl.
CPC .......... *H04M 3/5183* (2013.01); *H04W 4/14* (2013.01)

(58) Field of Classification Search
CPC ....... H04M 3/5183; H04W 4/14; H04W 4/21; H04W 12/128; H04L 51/216
See application file for complete search history.

(56) References Cited

U.S. PATENT DOCUMENTS 5,896,369 A 4/1999 Warsta
6,415,250 B1 7/2002 Van Den Akker
(Continued)

FOREIGN PATENT DOCUMENTS

AU 2003260743 B2 9/2008
CA 2460332 A1 4/2003
(Continued)

OTHER PUBLICATIONS

European Search Report for corresponding European application No. 09805443.0, mailed Dec. 11, 2013, total pp. 8.
(Continued)

*Primary Examiner* — Omoniyi Obayanju
(74) *Attorney, Agent, or Firm* — Butzel Long

(57) ABSTRACT

A method and system enables communications with a call center via SMS/MMS and provides an additional communications channel to communicate with the call center in addition to voice, Internet email/IM chat and fax. The call center obtains location information and images from a customer using SMS messages and web pages via a messaging hub.

30 Claims, 9 Drawing Sheets

Related U.S. Application Data filed on May 19, 2011, now Pat. No. 8,918,085, which is a continuation-in-part of application No. 12/535,323, filed on Aug. 4, 2009, now Pat. No. 8,694,031.

(60) Provisional application No. 61/164,705, filed on Mar. 30, 2009, provisional application No. 61/137,918, filed on Aug. 5, 2008.

(56) References Cited

U.S. PATENT DOCUMENTS

| | | |
|---|---|---|
| 6,449,483 B1 | 9/2002 | Akhteruzzaman |
| 6,591,103 B1 | 7/2003 | Dunn |
| 6,690,932 B1 | 2/2004 | Barnier |
| 6,757,365 B1 | 6/2004 | Bogard |
| 6,889,321 B1 | 5/2005 | Kung |
| 7,002,970 B1 | 2/2006 | Veschi |
| 7,010,312 B1 | 3/2006 | Zechlin |
| 7,181,538 B2 | 2/2007 | Tam |
| 7,197,035 B2 | 3/2007 | Asano |
| 7,263,076 B1 | 8/2007 | Leibovitz |
| 7,269,629 B2 | 9/2007 | Zmudzinski |
| 7,275,104 B1 | 9/2007 | Martinez |
| 7,318,073 B2 | 1/2008 | Shields |
| 7,343,168 B2 | 3/2008 | Valloppillil |
| 7,380,022 B2 | 5/2008 | Tell |
| 7,437,413 B2 | 10/2008 | Okuyama |
| 7,446,655 B2 | 11/2008 | Jha |
| 7,499,704 B1 | 3/2009 | Bonner |
| 7,532,712 B2 | 5/2009 | Gonder |
| 7,564,958 B1 | 7/2009 | Contractor |
| 7,606,568 B2 | 10/2009 | Gallagher |
| 7,627,338 B2 | 12/2009 | Hicks, III |
| 7,693,535 B2 | 4/2010 | Dunko |
| 7,716,297 B1 | 5/2010 | Wittel |
| 7,734,908 B1 | 6/2010 | Kung |
| 7,805,532 B2 | 9/2010 | Pattison |
| 7,805,746 B2 | 9/2010 | Brandyberry |
| 7,860,525 B2 | 12/2010 | Parkkinen |
| 7,865,198 B2 | 1/2011 | Shin |
| 7,940,896 B2 | 5/2011 | Prozeniuk |
| 8,000,456 B2 | 8/2011 | Khouri |
| 8,064,876 B2 | 11/2011 | Knight |
| 8,201,196 B2 | 6/2012 | Michael |
| 8,358,638 B2 | 1/2013 | Scherzer |
| 8,463,238 B2 | 6/2013 | Forstall |
| 8,463,304 B2 | 6/2013 | Lauer |
| 8,494,504 B2 | 7/2013 | Kirchhoff |
| 8,504,809 B2 | 8/2013 | Chien |
| 8,520,833 B1 | 8/2013 | Pettay |
| 8,570,906 B1 | 10/2013 | Croak |
| 8,578,261 B1 | 11/2013 | Gupta |
| 8,788,599 B2 | 7/2014 | Harju |
| 8,890,685 B1 | 11/2014 | Sookman |
| 8,934,871 B2 | 1/2015 | Finkelstein |
| 8,989,712 B2 | 3/2015 | Doulton |
| 8,989,713 B2 | 3/2015 | Doulton |
| 9,307,371 B2 | 4/2016 | Sureka |
| 9,710,982 B2 | 7/2017 | Matthews, III |
| 2002/0076031 A1* | 6/2002 | Falcon ............... H04M 3/5125 379/265.11 |
| 2003/0101244 A1 | 5/2003 | Lockridge |
| 2003/0185379 A1* | 10/2003 | O'Connor ............... H04L 51/56 379/265.02 |
| 2003/0225797 A1 | 12/2003 | Shields |
| 2003/0232623 A1* | 12/2003 | Balasuriya ............ H04W 8/186 455/507 |
| 2004/0076144 A1 | 4/2004 | Ishodoshiro |
| 2004/0109452 A1 | 6/2004 | Takihiro |
| 2004/0137923 A1 | 7/2004 | Lang |
| 2004/0156394 A1 | 8/2004 | Westman |
| 2005/0032518 A1 | 2/2005 | Rajan |
| 2005/0114518 A1 | 5/2005 | McMahon |
| 2005/0148353 A1 | 7/2005 | Hicks |
| 2005/0149335 A1 | 7/2005 | Mesbah |
| 2005/0181805 A1 | 8/2005 | Gallagher |
| 2005/0233733 A1* | 10/2005 | Roundtree ............ H04L 67/125 455/414.1 |
| 2005/0277407 A1 | 12/2005 | Ahn |
| 2005/0288045 A1 | 12/2005 | Yang |
| 2006/0040606 A1 | 2/2006 | Kangas |
| 2006/0040610 A1 | 2/2006 | Kangas |
| 2006/0074628 A1 | 4/2006 | Elbaz |
| 2006/0075052 A1 | 4/2006 | Oostendorp |
| 2006/0123360 A1 | 6/2006 | Anwar |
| 2006/0142012 A1 | 6/2006 | Kirchhoff |
| 2006/0148495 A1 | 7/2006 | Wilson |
| 2006/0259473 A1 | 11/2006 | Li |
| 2006/0259866 A1 | 11/2006 | Prasad |
| 2007/0026901 A1 | 2/2007 | McKay |
| 2007/0032225 A1 | 2/2007 | Konicek |
| 2007/0066318 A1 | 3/2007 | Danzeisen |
| 2007/0073585 A1 | 3/2007 | Apple |
| 2007/0082664 A1 | 4/2007 | Landschaft |
| 2007/0082686 A1 | 4/2007 | Mumick |
| 2007/0167178 A1 | 7/2007 | Al-Harbi |
| 2007/0190978 A1 | 8/2007 | White |
| 2007/0203850 A1 | 8/2007 | Singh |
| 2007/0238474 A1 | 10/2007 | Ballas |
| 2007/0263793 A1 | 11/2007 | Khouri |
| 2008/0004046 A1 | 1/2008 | Mumick |
| 2008/0032679 A1 | 2/2008 | Purontaus |
| 2008/0037456 A1 | 2/2008 | Chen |
| 2008/0043969 A1 | 2/2008 | Shi |
| 2008/0045250 A1 | 2/2008 | Hwang |
| 2008/0096588 A1 | 4/2008 | Waytena |
| 2008/0114862 A1 | 5/2008 | Moghaddam |
| 2008/0140850 A1 | 6/2008 | Gade |
| 2008/0153526 A1 | 6/2008 | Othmer |
| 2008/0172496 A1 | 7/2008 | Middleton |
| 2008/0182563 A1 | 7/2008 | Wugofski |
| 2008/0192908 A1 | 8/2008 | Okeefe |
| 2008/0198987 A1 | 8/2008 | Daly |
| 2008/0263137 A1 | 10/2008 | Pattison |
| 2008/0270556 A1 | 10/2008 | Bamford |
| 2008/0293404 A1 | 11/2008 | Scherzer |
| 2008/0310403 A1 | 12/2008 | Asoh |
| 2009/0003312 A1 | 1/2009 | Velazquez |
| 2009/0005005 A1 | 1/2009 | Forstall |
| 2009/0017789 A1 | 1/2009 | Thomas |
| 2009/0031232 A1 | 1/2009 | Brezina |
| 2009/0061925 A1 | 3/2009 | Finkelstein |
| 2009/0063280 A1 | 3/2009 | Wurster |
| 2009/0088188 A1 | 4/2009 | Wormald |
| 2009/0131090 A1 | 5/2009 | Jo |
| 2009/0138563 A1 | 5/2009 | Zhu |
| 2009/0144395 A1 | 6/2009 | Desalvo |
| 2009/0154434 A1 | 6/2009 | Tanaka |
| 2009/0156179 A1 | 6/2009 | Hahn |
| 2009/0156202 A1 | 6/2009 | Reiss |
| 2009/0164564 A1 | 6/2009 | Willis |
| 2009/0170478 A1 | 7/2009 | Doulton |
| 2009/0186634 A1 | 7/2009 | Sureka |
| 2009/0201916 A1 | 8/2009 | Caron |
| 2009/0249478 A1 | 10/2009 | Rosener |
| 2009/0319914 A1 | 12/2009 | Roseway |
| 2010/0029273 A1 | 2/2010 | Bennett |
| 2010/0035640 A1 | 2/2010 | Lew |
| 2010/0041376 A1 | 2/2010 | Osborn |
| 2010/0081460 A1 | 4/2010 | Knight |
| 2010/0124905 A1 | 5/2010 | Pratt |
| 2010/0161722 A1 | 6/2010 | Jeon |
| 2010/0262668 A1 | 10/2010 | Piett |
| 2010/0287215 A1 | 11/2010 | Lasensky |
| 2011/0045828 A1 | 2/2011 | Madan |
| 2011/0055014 A1 | 3/2011 | Kim |
| 2011/0070868 A1* | 3/2011 | Scholz ............... H04M 3/5183 455/412.1 |
| 2011/0142211 A1 | 6/2011 | Maes |
| 2011/0177796 A1 | 7/2011 | Jacobstein |
| 2011/0195722 A1 | 8/2011 | Walter |
| 2011/0296154 A1 | 12/2011 | Chien |
| 2011/0320960 A1 | 12/2011 | Cai |
| 2012/0083287 A1 | 4/2012 | Casto |

(56) References Cited

U.S. PATENT DOCUMENTS

| | | |
|---|---|---|
| 2012/0165048 A1 | 6/2012 | Zhu |
| 2012/0226759 A1 | 9/2012 | Lew |
| 2012/0275579 A1 | 11/2012 | Eng |
| 2013/0080898 A1 | 3/2013 | Lavian |
| 2013/0165086 A1 | 6/2013 | Doulton |
| 2013/0194135 A1 | 8/2013 | Farnham |
| 2013/0252649 A1 | 9/2013 | Siomina |
| 2013/0298037 A1 | 11/2013 | Matthews |
| 2014/0106701 A1 | 4/2014 | Silver |
| 2014/0179260 A1 | 6/2014 | Malin |
| 2014/0269679 A1 | 9/2014 | Gillis |
| 2014/0364082 A1 | 12/2014 | Baddeley |

FOREIGN PATENT DOCUMENTS

| | | |
|---|---|---|
| CN | 100579313 C | 1/2010 |
| DE | 102004045481 A1 | 3/2006 |
| EP | 1487224 A1 | 12/2004 |
| EP | 1850572 A4 | 12/2008 |
| EP | 1763200 B1 | 1/2016 |
| FI | 115187 B | 3/2005 |
| GB | 0300779 | 2/2003 |
| GB | 2397730 B | 6/2006 |
| GB | 2431820 A | 5/2007 |
| JP | 2003124962 A | 4/2003 |
| JP | 3789374 B2 | 6/2006 |
| JP | 3865946 B2 | 1/2007 |
| JP | 4765182 B2 | 9/2011 |
| KR | 100646478 B1 | 11/2006 |
| KR | 20110024581 A | 3/2011 |
| TW | 463503 B | 11/2001 |
| WO | 2005112401 A2 | 11/2005 |
| WO | 2007015075 A1 | 2/2007 |

OTHER PUBLICATIONS

International Search Report and Written Opinion mailed Dec. 7, 2011 in corresponding International Application No. PCT/US2011/037190.
International Search Report for International Application No. PCT/US2009/052715 dated Sep. 24, 2009.
International Search Report and Written Opinion dated Sep. 24, 09 from corresponding International Application No. PCT/US2014/038906.
International Search Report and the Written Opinion for International Application No. PCT/US2016/029667, 3 Pages, date of mailing Aug. 5, 2016.
International Search Report and the Written Opinion of the International Searching Authority for PCT/US2016/029665, 2 pages, dated Aug. 11, 2016.

\* cited by examiner

CALL CENTER MOBILE MESSAGING

CROSS REFERENCE TO RELATED APPLICATIONS

This application is a continuation in part of United States Patent Application having Ser. No. 13/803,331 entitled "MOBILE MESSAGE ENABLING ENTERPRISE OFFICE TELEPHONE NUMBERS," filed Mar. 14, 2013 that shares inventorship with the present application and which is a continuation in part of United States Patent Application having Ser. No. 13/441,105 entitled "MESSAGING HUB SYSTEM," filed Apr. 6, 2012 that shares inventorship with the present application and which is a continuation in part of United States Patent Application having Ser. No. 13/111,109 entitled "SOCIAL MESSAGING HUB," filed May 19, 2011 that shares inventorship with the present application and which is a continuation in part of United States Patent Application having Ser. No. 12/535,323 entitled "SMS TECHNOLOGY FOR COMPUTERIZED DEVICES," filed Aug. 4, 2009 that shares inventorship with the present application and which claims the benefit of U.S. provisional patent application Ser. No. 61/137,918, entitled "Apparatus and methods for TV applications," filed Aug. 5, 2008; 61/164,705, entitled "SMS Technology for Computerized Devices," filed Mar. 30, 2009; and 61/346,133 entitled "MESSAGING SYSTEM AND DEVICES," filed May 19, 2010; that share inventorship with the present application. The entire teachings and contents of these Patent Applications are hereby incorporated by reference herein in their entireties.

FIELD OF THE INVENTION

The present invention relates to call center operations and access to call centers via SMS communications from mobile devices.

BACKGROUND

Conventional call centers receive most calls through a telephone network. Additionally, customer can communicate with a call center using other communications channels, for example, email and IM style chat (commonly referred to as LiveChat).

SMS marketing campaigns referred to as application to person (A2P) utilize messages sent from a subscriber to an application or messages sent from an application to a subscriber. A2P is commonly used by financial institutions, airlines, hotel booking sites, social networks, and other organizations sending SMS from their systems to their customers. However, because of several technical challenges, SMS communications have not been employed in conjunction with call center operations.

SUMMARY OF THE INVENTION

Even though consumers sometimes use social media to air their grievances with companies, with text messaging consumers can achieve a satisfactory resolution to a support issue, versus simply publicly posting a complaint via social media (e.g., Twitter or Facebook). Social media simply doesn't provide the immediacy, intimacy or impact of a live text-based conversation.

Enabling a Customer Call Center to communicate via SMS in addition to its traditional call center communications (voice, fax, IM/chat) is achieved in accordance with one embodiment by a method including: identifying the call center telephone number, provisioning the call center telephone number, establishing an interconnection between the messaging hub and a message mobile aggregator, mobile service provider or mobile carrier for message routing, establishing a secure connection between the messaging hub and a call director of the call center and receiving a customer message directed to the call center; determining whether the received customer message is starting a new conversation. In response to determining that there is a new conversation, the method further includes creating a conversation thread and a corresponding conversation thread token and passing the corresponding conversation thread token to a call director. In one embodiment, provisioning the call center telephone number includes: provisioning the call center number including routing information into a carrier database directory, provisioning the call center number into a messaging hub database directory and provisioning the call center number into an industry registration directory database.

Such a method (also referred to as "Live Texting") solves a problem that has not been solved yet in a manner that allows call centers to use existing support phone number for text conversations between customers and CSRs. There are no new numbers for customers to remember and no need for SMS short codes. Such a method seamlessly integrates into existing customer support consoles; securely stores and archive text messages conversations; resolves issues more efficiently than traditional voice only call centers; and improves customer satisfaction. In contrast to a web chat session which has a finite amount of time before timing out, a Live Texting conversation does not time out. Live texting also lets a CSR to seamlessly move to a voice call if needed. This move to voice cannot happen with web chat as currently implemented.

In a further embodiment, the technique includes providing a web page with instructions to return an SMS message to the call center one of location information of the customer to the call center and an image to be taken by the customer, embedding in an SMS message a uniform resource locator (URL) referring to the web page and receiving an SMS message with one of the location information of the customer and the image taken by the customer. This embodiment further includes processing the received SMS message and displaying the location information of the customer, directions to the customer location or the image taken by the customer. Such a technique, allows the CSR to obtain the location of the customer and to gather additional information to enable the CSR to assist the customer.

Other embodiments of the invention that are disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor and a display, programs the processor to perform the operations disclosed herein. Such arrangements are typically provided as software, code and/or other data (e.g., data structures) arranged or encoded on a computer readable medium such as an optical medium (e.g., CD-ROM), hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

Other configurations include web applications, browsers, IP applications and data enabled device applications as will be explained in more detail.

Another embodiment enabling a call center to communicate with a mobile device via SMS/MMS/EMS message communication includes establishing a secure connection between a messaging hub and a call center, identifying a call center telephone number, provisioning the call center telephone number and providing an interface between call center operations and the mobile device. The provisioning includes registering the call center telephone number with the messaging hub having access to a SMSC/MMSC and registering the call center telephone number in a database accessible by an SMSC/MMSC with access to a global SMS/MMS network.

In a further embodiment, the provisioning the call center telephone number further includes provisioning the call center telephone number with industry and carrier database directories with appropriate routing information including origin, destination, IP address (if appropriate), network ID and entity ID, provisioning the call center telephone number into industry white lists for exception processing of call center characteristic traffic patterns, provisioning the call center telephone number into the messaging hub database directory and servers to act as host, storage and router of the call center telephone number and provisioning the call center telephone number into industry registration directory databases with associated entity information.

It is to be understood that the features of the messaging hub and call center can be embodied strictly as a software program, as software and hardware, or as hardware alone such as within a single processor or multiple processors, or within an operating system or within a software application.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention. These and other features of the invention will be understood from the description and claims herein, taken together with the drawings of illustrative embodiments, wherein

DETAILED DESCRIPTION

In an exemplary embodiment, a customer instead of calling 800-123-4567 (the published operational call center telephone number) a consumer/customer sends an SMS text message to, for example, 800-123-4567 with a question or issue for a call center to resolve. At the call center, a call director enables the Customer Service Representatives (CSRs) to field and respond to the SMS messages on his or her normal workstation. The customer in some embodiments receives an SMS response from the CSR with (800) 123-4567 as the "sending" party in the SMS message.

In certain embodiments the messaging hub enables the monitoring, auditing and archiving of SMS/MMS communications by call center personnel without changing the basic function of SMS/MMS by operating SMS/MMS over IP technology and implementing tools for directing messages to CSRs and maintaining continuity in call center message threads. Methods and systems for operating SMS/MMS over IP and specific implementations for call centers disclosed herein (e.g., utilizing existing call center telephone numbers) facilitate SMS communications between consumers and call centers. A customer texting an 800-xxx-xxxx call center number, just needs to have basic SMS functionality on a mobile device (available in most every recently manufactured cell phone). Alternatively the customer can use an IP based text messaging service, for example, HeyWire provided by MediaFriends Inc. In some embodiments IP based text messaging service provides additional features when contacting a call center (e.g., automatically supplying additional information about a device or location information).

Figure 1:
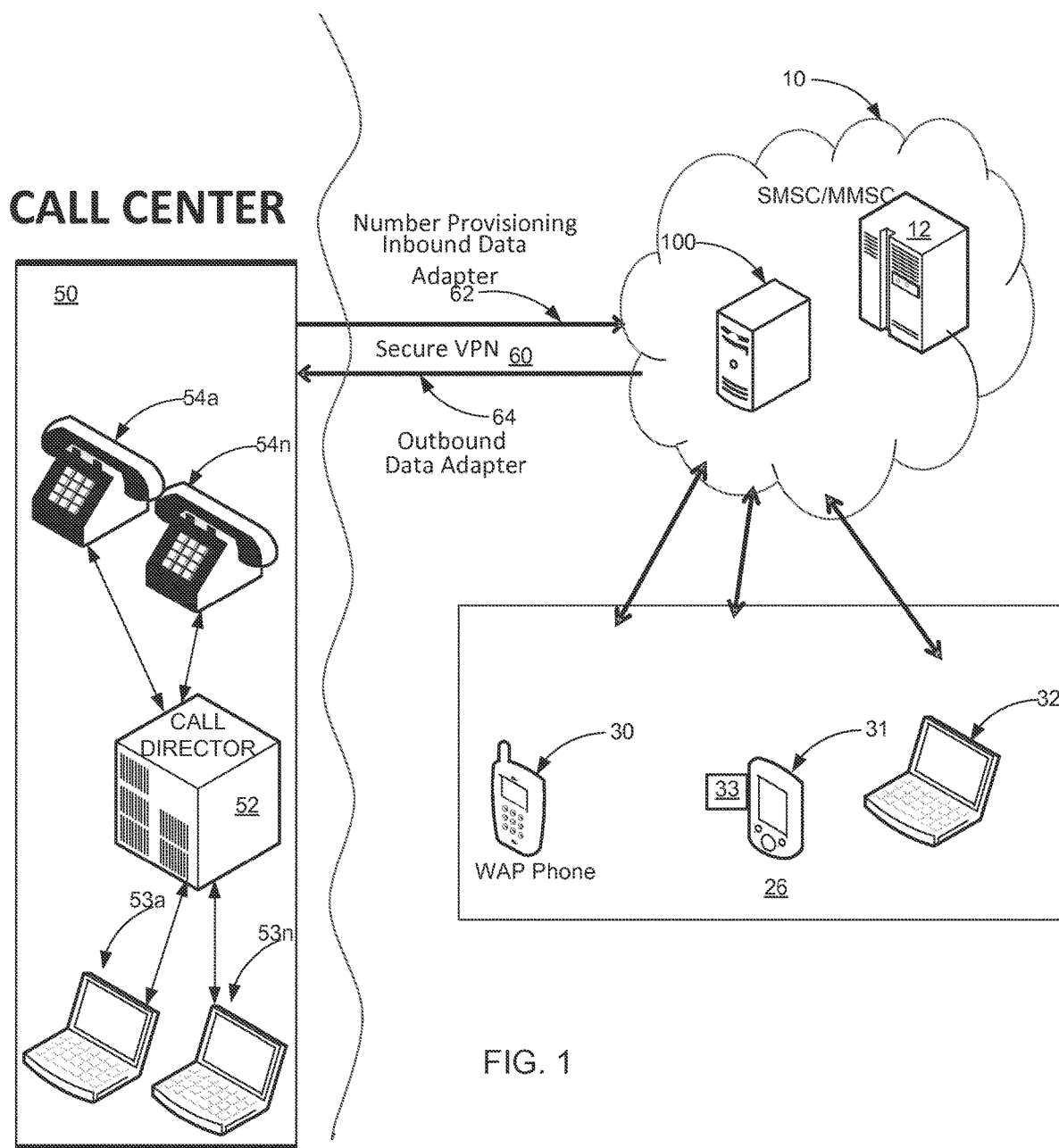
FIG. 1 is a schematic illustration of a messaging hub, a unified communications service and network environment/messaging infrastructure in accordance with one example embodiment disclosed herein.

Now referring to FIG. 1, an exemplary messaging hub 100 operates in network environment 10 and relay messages between user devices 26 and a call center 50. User devices 26 include, for example, a mobile phone 30, a smartphone 31 a laptop 32 and other data enabled devices (not shown) such as a netbook and a tablet. The smartphone 31 can include a location device, for example a built in GPS 33 (or other location device or location software). The messaging hub 100 communicates with the call center 50, in one embodiment, over a secure connection 60 (e.g., a VPN connection). The call center 50 generally includes a call director 52 or alternatively other systems for dispatching customer call to CSRs. The call center generally includes multiple voice telephones 54a-54n and multiple workstations 53a-53n for use by the CSRs (collectively referred to as CSR workstation 53). In one embodiment, the messaging hub 100 and call center 50 communicate data, number provisioning information, messages and message thread information over the secure connection 60.

In operation, the messaging hub 100 establishes a secure connection to a local short message service center/multimedia message service center SMSC/MMSC 12 and the data adapters (communication interfaces) 62 and 64 of call center 50. The SMSC/MMSC 12 is a network element in the network environment 10. The SMSC/MMSC 12 purpose is to store, forward, convert and deliver SMS/MMS messages.

The messaging hub 100 identifies a call center telephone number provided by the call center 50. In one embodiment the messaging hub 100 identifies a block or pool of call center phone numbers (e.g., 617-555-0001 to 617-555-9999 non-toll free call center telephone numbers which can serve as a hunt group for the toll free call center number) to be enabled for call center operation. The messaging hub 100 provisions the call center telephone number and then messages can be directed to the call center telephone number from one or more of the user's devices via SMS messaging. The provisioning process is detailed below in conjunction with FIG. 4. The call director 52 direct calls (messages or voice conversations) to the appropriate CSR, and has the ability in conjunction with the messaging hub 100 to maintain the integrity of a customer query or issue given the limited size of an SMS message (i.e., 160 or 140 characters). In one embodiment, the call director 52 switches the conversation thread to and from voice communication and SMS messaging. In one embodiment, a graphical user interface running on the CSR workstation 53 allows the CSR to receive and compose SMS messages and to view or listen to multimedia attachments.

Figure 2:
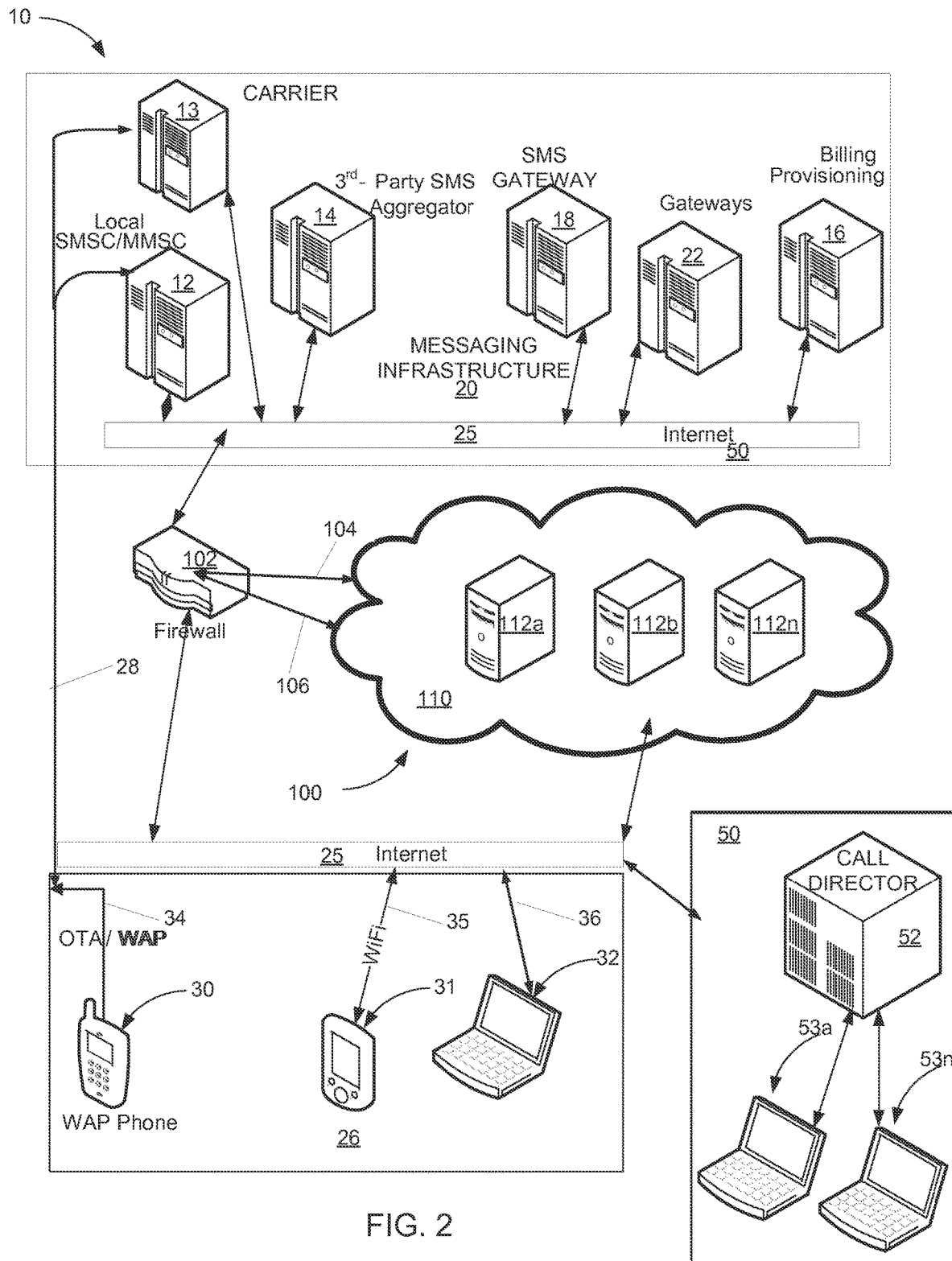
FIG. 2 is a more detailed schematic illustration of the messaging hub and messaging infrastructure of FIG. 1.

Now referring to FIG. 2, the exemplary messaging hub 100 operates in the network environment 10 which includes global messaging infrastructure 20. The messaging hub 100 includes one or more processors 112a-112n and is coupled to the network environment 10 and global messaging infrastructure 20 through a firewall 102. The firewall 102 is typically located at a messaging hub 100 hosting facility. The global messaging infrastructure 20 includes, but is not limited to, a local Short Message Service Center/Multimedia Messaging Service Center (SMSC/MMSC) 12, a third party SMS/MMS aggregator 14 (also referred to a SMS/MMS aggregator 14), a billing and provisioning system 16, an SMS/MMS Gateway (SMS/MMS-GW) 18, messaging gateways 22 and a cellular phone infrastructure 28. Other components of the global messaging infrastructure 20 include an external (Global) SMSC/MMSC network 13 and additional SMS/MMS-Gateways and other SMSCs/MMSCs and billing and provisioning systems provided by additional mobile carrier service providers (not shown). The local SMSC/MMSC 12 and the billing and provisioning system 16 are typically operated by a mobile carrier service provider. The Global SMSC/MMSC network 13 is typically operated by multiple mobile carriers and third parties. The messaging gateways 22 include connections to IM services, for example AOL instant messenger (AIM), Yahoo Messenger, Windows Live Messenger, Jabber, Skype, Tencent QQ, ICQ and GoogleTalk (gTalk), and other networks such as Facebook and Twitter.

In one embodiment, the messaging hub 100 communicates with the systems in the global messaging infrastructure 20 (e.g., local SMSC/MMSC 12, the third party SMS/MMS aggregator 14 and the billing and provisioning system 16) using various network protocols including the Short Message Peer-to-Peer (SMPP) protocol, Hypertext Transfer Protocol (HTTP), Wireless Application Protocol (W AP), Signaling Transport (SIG TRAN) protocol or SS7 protocol. The SMPP protocol is a telecommunications industry protocol for exchanging SMS messages between SMS peer entities. The MM4 and MM7 protocols are telecommunications industry protocols for exchanging MMS messages between MMS peer entities. The HTTP and W AP protocols are a telecommunications industry protocols for exchanging SMS/MMS messages between SMS/MMS server and client entities.

In this embodiment, the link between the messaging hub 100 and the global messaging infrastructure 20 is secured by the firewall 102 using a virtual private network (VPN) connection with HTTPS using 128-bit or higher encryption, for example, 1024 bit (3DES-SHA1) encryption. Messages are transferred over SMPP link 104 and provisioning and single sign on (SSO), XML and SOAP messages and other control traffic are interchanged over control link 106. In another embodiment, messages are transferred over SIGTRAN (SS7 over IP) depending on the connection (e.g., a connection to a European Mobile Operator).

The messaging hub 100 is connected via the Internet 25 or a dedicated connection to the global messaging infrastructure 20 that relays messages between existing customer equipment, for example, a mobile phone 29, a data enabled mobile phone 30, a data enabled WiFi phone 31 and other data enabled devices (not shown) such as a laptop, netbook, tablet and a smart phone. The mobile phone 29 can be connected to the messaging hub 100 over the cellular phone infrastructure 28 through the local SMSC/MMSC 12 using an SMS protocol. The messaging hub 100 is connected via the Internet 25 or a dedicated connection to the call center 50 of one or more business enterprises. The Global SMSC/MMSC network 13 is also connected to the cellular phone infrastructure 28. The mobile phone 30 can be connected to the messaging hub 100 over the cellular phone infrastructure 28 using a data connection provided by OTA/WAP protocols. A data enabled WiFi phone 31 can be connected to the messaging hub 100 via a WiFi connection to the Internet. It is understood that a mobile phone can be data enabled via both a WAP connection and a WiFi connection. The data enabled WiFi phone 31 is sometimes referred to as a dual mode phone if it can also connect over WAP.

In operation and as described below in more detail, a customer can send a text message to the call center 50 using the call center's 800 number or any other number provisioned for SMS messages to be directed to the call center. The customer can use any device, application and any communications path (e.g., OTA or IP connection) which is enabled for SMS messaging. After the provisioning process, messages sent from the customer are directed through the global messaging infrastructure 20 by an SMS aggregator 14, local SMSC/MMSC 12 or a carrier 13 to the messaging hub 100. The messaging hub 100 determines that the message is intended for a particular call center, communicates with the call center 50 with corresponding applications and the message is delivered to the call center 50 as described in more detail below in further detail.

Figure 3:
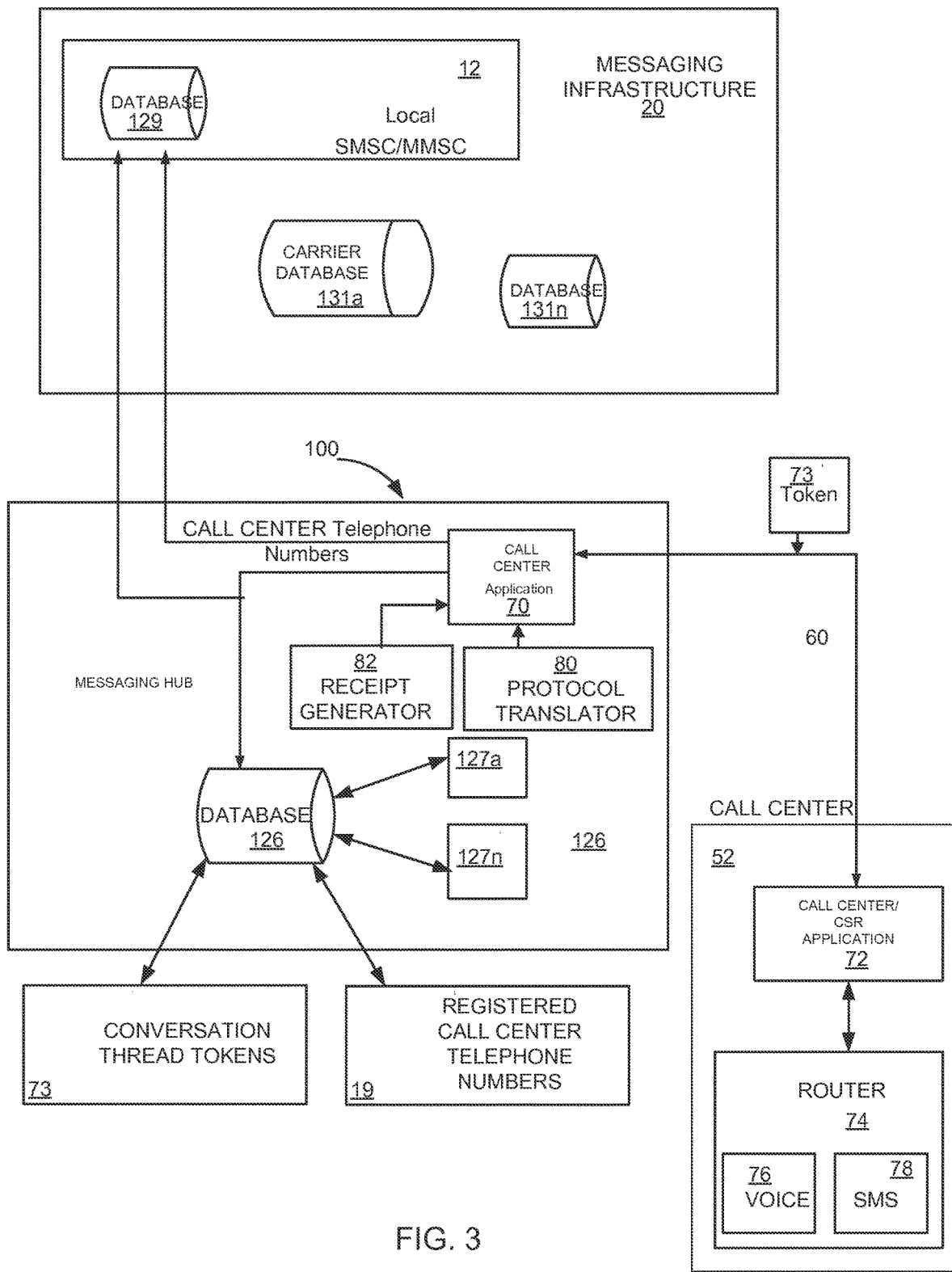
FIG. 3 illustrates details of an embodiment of the messaging hub of FIG. 1 including details of the provisioning process and the call director.

FIG. 3 illustrates further details of the provisioning process and communication between the messaging hub 100 and the call center 50. The messaging hub 100 includes a Hub call center application 70 which communicates with a corresponding call center/CSR application 72 in the call center 50 over the secure connection 60. The Hub call center application 70 creates a conversation thread with an associated conversation thread token 73 for a fixed period of time to survive the length of the conversation within parameters defined by the call center 50. The conversation thread token or equivalent is established for each session linking the Customer Service Representative (CSR) with the customer, regardless of voice, SMS or webchat mechanisms, providing the ability for any and all of the communications methods used to stay within a 'thread' between the specified CSR and customer (association). In one embodiment, the Hub call center application 70 communicates conversation thread information with the call center/CSR application 72 by associating the conversation thread token 73 with the specific assigned CSR agent as defined by router 74 for each particular conversation thread. The association with the assigned CSR is accomplished via one of several identity mechanisms which can be included in the conversation thread token parameters including, but not limited to using a unique CSR terminal id (e.g.—MAC address); unique IP based session parameter variables; the CSR's unique call center login credentials (e.g.—login userid); the CSR's unique communications address. The communications address can include, for example, a telephone number, with or without an extension, an email or an instant messaging (IM) address.

All messages for the identified conversation thread in both directions between Hub call center application 70 and call center/CSR application 72 retain the associated destination endpoints for sending and receiving for the duration of the conversation. Upon completion of the conversation thread session, (which in one embodiment is defined by a parameters by the call center 50 operator), the token and its associated conversation thread are released along with all associated data established to maintain message flow and termination to the specific destination endpoints.

During operational setup, a call center telephone number (or a block of numbers) is transferred to the messaging hub 100. The call center telephone numbers are pushed or published into the database of the various directories, for example a carrier database 129 of the local SMSC/MMSC 12 and/or industry databases 131a-131n of other SMSC/MMSCs in the global messaging infrastructure 20. The messaging hub also 100 registers call center telephone numbers 19 and stores conversation thread tokens 73 in a database 126. In one embodiment, the call center telephone numbers are registered and conversation thread tokens 73 are stored in a plurality of virtual databases 127a-127n (supported by physical database 126), each virtual database corresponding to a different call center.

Landline numbers are not typically registered with any of the industry directories, operators or SMS/MMS aggregators within the mobile ecosystem. When SMS/MMS messages are processed by a mobile operator or SMS/MMS aggregator, the aggregator or operator needs to find a registered number in the various directories to determine if the number is a legitimate and active number and where to route the SMS/MMS message. All phone numbers are associated with an "owner of record" in the various databases in the mobile ecosystem and the appropriate routing destination is determined by "who" the owner of record is for the particular number in question. The Messaging hub 100 enables recognition and routing capabilities by provisioning landline numbers into the various databases in the mobile ecosystem. When an entity such as any mobile operator or SMS/MMS aggregator receives a message for routing, upon query to one or more of the industry's databases, it determines who is the owner of record for the message based on the destination phone number of the SMS/MMS message.

For example in one embodiment, a message with a destination phone number of +1 800-123-4567, that was provisioned by Messaging hub 100 into the various databases, is identified as Messaging hub 100 as the "owner of record," and thus routed to Messaging hub servers and network for handling. Upon receipt by Messaging hub 100, the SMS provider 120 in conjunction with the web servers 152 which maintain state and session information and using records in the database 126 can determine the actual user of the phone number and locate the active call center 50 wherever the call center 50 is using the Internet, then deliver the message to the call center 50, or queue the message if no session is possible with any of the call center 50 user devices associated with the conversation thread token at the time the message arrives. The directories including these databases are situated in a local, regional, national or international network. There are copies of a government master directories and subsets of the master government directories which are used and provided by the government.

Provisioning of the call center telephone numbers (obtained from the call center 50 through call center application 72 or other means, and messaging hub call center application 70 in the messaging hub 100) into all the assorted databases, public and private, in the global messaging infrastructure 20 requires recognition and allowance by the mobile operators for mobile messages from non-mobile operator sources to flow through the network. This recognition and allowance is provided in advance of provisioning of call center telephone numbers. As a result of provisioning by the messaging hub 100, the call center telephone numbers reside and are registered in databases that are queried by the SMSC/MMSCs and other mobile industry elements.

Every SMS/MMS message originating or terminating from a predefined set of call center telephone numbers is also associated with a specific or group of specific an identification data element, for example a Service Provider Identifier (SPID) electronic SPID (eSPID) virtual SPID (vSPID) alternate SPID (AltSPID) identifier of a second service provider (collectively referred to as SPID) Operating Company Number (OCN) or a Session Initiation Protocol (SIP) uniform resource identifier (URI) (SIP URI), in a database for identification purposes of the originating/terminating enterprise. A SIP URI is very similar to an Internet URL and is generally a way to assign an IP address (by pseudo name) to resources as the 'owner' (i.e., accomplishes the same task as a SPID, but using Internet IP technology).

A Letter of Authorization (LOA) is required in order to provision phone numbers into the various industry databases from the "owner of record" or the business entity paying for the cost of the phone numbers. LOA's are business legal agreements/contracts between two parties that authorize from the owner of record or the business entity paying for specified phone numbers to allow the designee permission to use the specified phone numbers for the specific purpose listed in the LOA. LOA's can be generated for a single phone number. However, an LOA could cover a range of phone numbers, such as 617-555-0000 through 617-555-9999, or whatever range is designated. If the target phone numbers are not sequentially numbered, then each number would be specifically listed in the LOA.

For example, if X Corp is the "owner of record" of a phone number for a call center, but someone else, for example the messaging hub 100 will route messages on behalf of an some X Corp employee (user of the phone number), an LOA is required by all of the database owner operators to allow "provisioning" into the database of an SMS/MMS 'route' for the intended phone number. In other words, the LOA grants "permission" to Messaging hub 100, to utilize the phone number for an SMS/MMS purpose as specified in the LOA. Here, Messaging hub 100 uses the LOA to enable SMS/MMS routing. The LOA is the permission to use the phone numbers for the specific purpose, here for SMS/MMS traffic.

A Service Provider Identifier (SPID) is an alphanumeric number that identifies a specific carrier network or subset network of a larger carrier or IP defined network. A Session Initiation Protocol Uniform Resource Identifier (SIP URI) is a data set that identifies a specific carrier network, subset network of a larger carrier network, network service provider, virtual network service provider or service provider. When the call center 50 obtains telephony service 51, a telephone company assigns a SPID to the line. The first ten digits beyond the country code identification identify the telephone number, called the Directory Number (DN). All SMS messages are associated with a particular an identification data element (e.g., SPID or SIP URI) for identification/ownership/association purposes, and the SPIDs or SIP UR is are processed by Messaging hub 100. The an identification data element (e.g., SPID or SIP URI) indicates that, for example, an SMS message is coming from or being sent to call center of X Corporation. Handling the identification data element is part of the provisioning process. When messaging hub 100 provisions a phone number or block/range of numbers, an identification data element is associated with each number to identify the associated call center user of those numbers.

In one embodiment, E.164 numbers are used. E.164 is an ITU-T recommendation that defines the international public telecommunication numbering plan used in the PSTN and some other data networks. It also defines the format of telephone numbers. E.164 numbers can have a maximum of fifteen digits and are usually prefixed with a '+'. To actually dial such numbers from a normal fixed line phone, the appropriate international call prefix must be used. The identification data elements (e.g., SPID, ESPID, VSPID and AltSPID) are generated by different organizations. The OCN/SPIDs are generated by NECA (National Exchange Carrier Association) in North America. In the rest of the world, it is handled by its counterpart organizations. ESPID, VSPID and AltSPID are generated by a variety of organizations including NetNumber, TNS, SAP, Syniverse, MACH, Neustar and BICS. ESPID, VSPID and AltSPID are 'private/proprietary' versions of the SPID. They are used by the private databases operated by NetNumber and others to 'route' traffic associated with that particular ESPID/VSPID/AltSPID. The ESPIDs, VSPIDs and AltSPIDs can be used to denote 'sub-category' traffic of a larger SPID (e.g., AT&T) to create sub-categories under AT&T.

The identification data elements (e.g., SIP URis) are generated by the owning organizations of the service provider of the services being provided to the call center for the non-mobile messaging services. Its purpose is to provide a uniform standard network identification format based upon industry standards utilizing conventional and accepted Internet addressing mechanisms that enable the location of the owning service provider network to be discoverable for routing purposes. It is understood that a SIP URI refers to an Internet IP location/address while an SPID is a label, however both serve a similar identification purpose.

The call center 50 call director 52 is similar to an Automated Call Director (ACD) but includes a router 74 which has a voice subsystem 76 and an SMS subsystem to provide the additional functionality to route SMS messages to CSR workstations 53. It is noted that call center 50 routers 74 (also referred to as routing switches 74) are not conventional telephone company or Internet switches based on standard protocols. Call center 50 routing switches are typically custom proprietary systems (non-standards based) and built specifically for call center functionality. Some conventional call center routing switches have a limited capability to handle non-voice communications such as email, IM/chat, but in order to correctly route SMS message traffic to the correct CSR workstation, the messaging hub 100 call center application provides messages, tokens and threads to the call center router 74. In one embodiment, the call center/CSR application 72 emulates an IM/Chat session, and in another embodiment it provides a multimedia session encompassing text (SMS), pictures/video (MMS or functional equivalent) and possibly inclusion of 2-way audio voice conversation within the same CSR workstation window or across multiple CSR workstation windows that the call center router can understand and pass on/assign to a specific CSR.

The call director 52 determines which communications mechanisms (text, voice, pictures, video) are allocated for the particular CSR session and associates each communications mechanism to the token 73 for that particular session in real-time for the purposes of maintaining association with the relevant CSR handling the user that initiated the session with the call center 50. All relevant and associated communications methods used for a particular session are identified as part of same user session on the CSR's display through use of same window or in case of multiple windows, use of various UI (User Interface) techniques such as dynamic labeling of associated windows with the specific user identification in some combination of names, colors or other UI methods.

Furthermore in some embodiments, the messaging hub 100 connection to the call center router 74 typically uses a protocol other than SMPP (the standard SMS protocol) or MM4/MM7 (the standard MMS protocols) and thus protocol translations are performed by a protocol translator 80 in the messaging hub 100 to communicate with the call center. Typically a translation from SMPP to XMPP/SIMPLE is performed. If the call center uses non-industry standard protocols, additional translation from whatever protocol the call center router 74 uses an industry messaging protocol such as XMPP or SIMPLE. Also, in one embodiment, if the CSR composes messages that are greater than 160 char in size, the messaging hub 100 parses the message into multiple 160 char messages and ensures the right order of delivery (msg #1—initial characters delivered first, followed by msg #2, etc.) by queueing the multiple messages in proper order based on a time stamp. If the user interface (UI) allows the CSR to input more than 160 character, the messaging hub 100 parses the continuous character stream from beginning to end, separating the stream into 160 character blocks, buffering and queueing the messages for delivery in proper order with a time interval between each message for transmittal set to a minimum of 0.1 second to enable upstream SMS/MMS carriers and aggregators to properly determine sort order and allow for buffering and queueing to maintain proper sequence of messages for delivery. In another embodiment, if the UI for a call center 50 limits each entry of the CSR to 160 characters.

The implementation of "receipts" is also provided by a receipt generator in the messaging hub 100. Receipts are sometimes required because some mobile carriers and mobile inter-carrier operators expect receipts to verify delivery of SMS/MMS messages, and thus the messaging hub 100 must generate these receipts.

Figure 4:
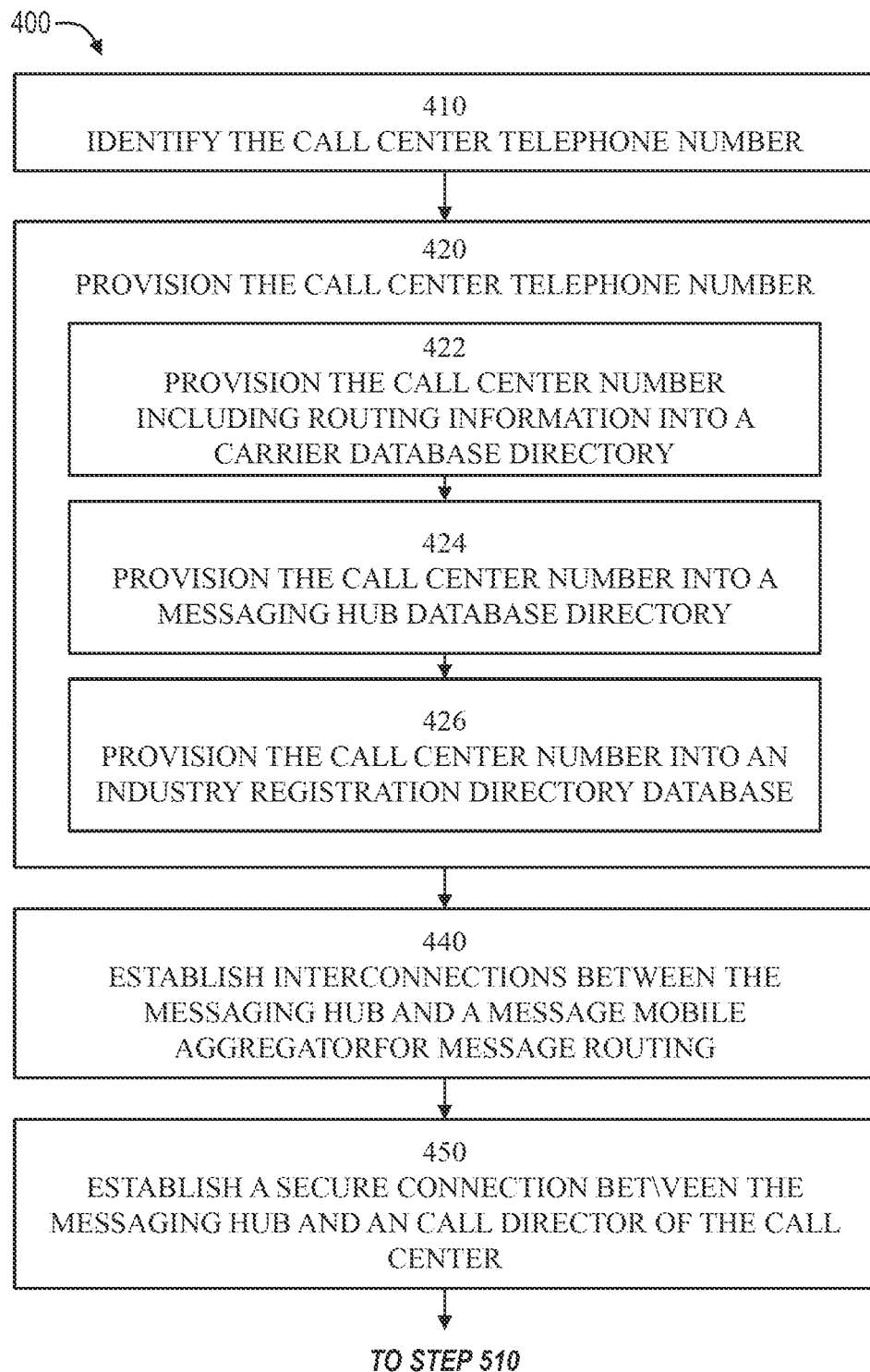
FIGS. 4-5 are flow charts of processing steps performed for provisioning call center telephone numbers and operation of the messaging hub in conjunction with the call center of FIG. 1.

In FIG. 4, flowchart 400 diagrams the overall process of enabling the call center 50 to communicate with customers via SMS/MMS/EMS message communication using the same call center telephone number used for voice communications. In step 410, the call center telephone number is identified. In one embodiment, the call center 50 notifies the messaging hub 100 of its 8xx-xxx-xxxx number for voice communication and the corresponding real telephone number that the 8xx number forward calls to (generally 8xx toll free numbers are not 'real' telephone numbers but merely aliases that forward onto a real telephone number).

In step 420, the call center telephone number is provisioned for SMS communication. In one embodiment, the provisioning process includes provisioning the call center number including routing information into a carrier database directory in step 422. In step 424, the call center telephone number is provisioned into the messaging hub 100 database directory. In step 426, the call center telephone number is provisioned into an industry registration directory database. Exemplary industry registration directory databases include but are not limited to, the NetNumber database, the Neustar database, and the SMS/800 database.

In one embodiment, the provisioning process includes provisioning the specific call center number or block of call center telephone numbers into mobile ecosystem including assigning unique SPID or other network identifier of its unique SMS/MMS traffic for the specific call center business and provisioning specified block of numbers to databases of all mobile entities involved in SMS/MMS traffic routing (e.g., Verizon, AT&T, SAP, Syniverse, etc.). After provisioning, the SMS/MMS routers and handlers in the mobile network recognize the DID's associated with provisioned call center business as belonging to a particular identification data element (e.g., SPID or other network identifier) and as such, will route appropriately based on assigned SPID or SIP URI to the messaging hub 100. Whenever any SMS/MMS router or handler within the mobile network encounters a message associated with the corresponding assigned identification data element, the router will either direct the inbound messages toward the messaging hub 100 designated for handling that identification data element or be routed to the appropriate routers or servers for processing for outbound messages.

In some embodiments, the provisioning process includes determining the 8xx toll free number(s) of call center to be enabled (in other embodiments call center operation can also be applied to non-toll free numbers of call centers as well). Details of the provisioning process include provisioning the 8xx toll free number(s) with industry databases (e.g., the NetNumber database, or the Neustar database, or the SMS/800 database and additionally in some embodiments with carrier database directories with appropriate routing information (origin, destination, network ID, entity ID). In some embodiments, the 8xx toll free number(s) are provisioned into industry "white lists" for exception processing of call center characteristic traffic patterns such as high volume (greater than what would be considered 'normal' by a single human being sending and receiving on a mobile phone) of SMS/MMS messages that originate or terminate to a single phone number, the call center 50 phone number, which would trigger traps and filters in carriers and other industry entities as 'unusual' traffic pattern behavior by blocking such traffic.

Each "conversation" from the first message is tracked by "pairing" an assigned CSR and the customer who is initiating the call center discussion in the call center application 72. The "pairing" creates a unique conversation thread that is tracked and retained in the messaging hub and the call center application 72 for a session, and for future retention purposes, so that historical record can be maintained of the actions on the particular CSR and the customer or other factors (e.g., product, geographic location, date/time, etc.). In one embodiment, a token is created by the messaging hub 100 to pass onto the call center application 72 so that it can ensure the same CSR is processing the thread as well as the customer, to maintain a consistent flow of messages for that conversation. It is understood that the token functionality can be implemented using several equivalent programming techniques.

The assignment of the sending address in the messages sent by the CSR is accomplished in the messaging hub 100 based on parameters transmitted by the call center 50 specifying address should be placed in the Origin field of the sending message (e.g., Business call center telephone number, Business name, Business product name, etc.). This is implemented by using the conversation thread token 73 or other technology for passing parameters as is known in the art. In step 440, an interconnection between the either a messaging hub or a mobile carrier and a message mobile aggregator for message routing is established. In one embodiment, the call center/CSR application features are integrated in ACDs provided by Interactive Intelligence.

Figure 5:
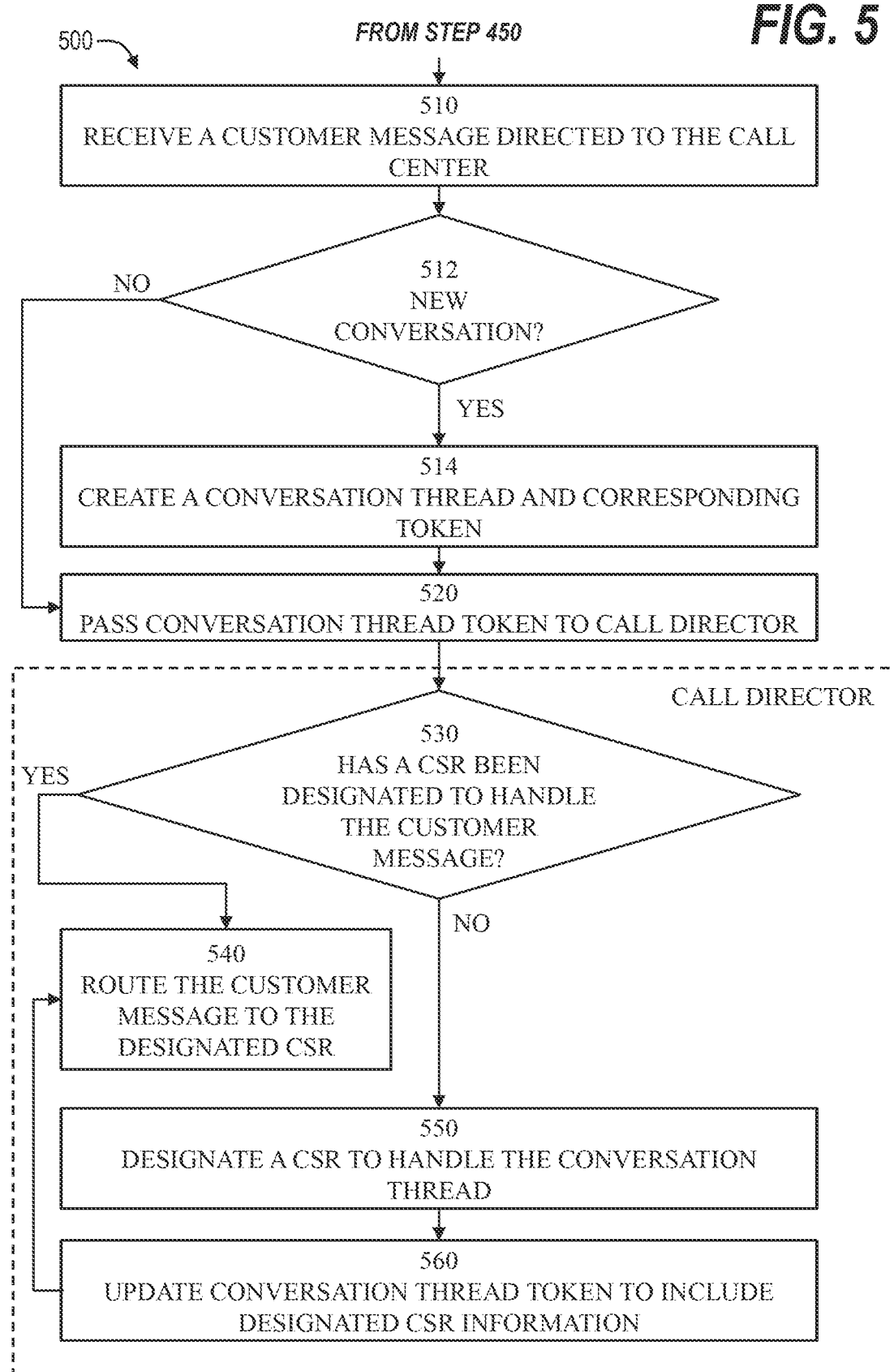

FIG. 5 diagrams further steps in the process of enabling a call center to communicate with customers via SMS/MMS/EMS message communication using the same call center telephone number used for voice communications. In step 510 a customer message directed to the call center is received at the messaging hub 100. In step 512 it is determined whether the received customer message is starting a new conversation. In step 514, in response to determining that there is a new conversation, a conversation thread and a corresponding conversation thread token are created.

In one embodiment, a determination of when there is a new conversation can be based on detecting a new customer address in the text message, comparing the lapsed time from a previous message to a predetermined time interval, and parsing a text message for key phrases (e.g., "new problem" or detecting a reference to a new product. In any case, a CSR newly assigned to a conversation would have access to a detailed history of any previous call for the customer as required.

In one embodiment, the messaging hub 100 securely stores and archives text messages conversations. This can be accomplished by storage in one of several locations depending, for example, on the individual enterprise call center requirements. Some call centers store the messages in the "cloud," (i.e., on storage across the Internet), on the messaging hub's servers, or locally on the Enterprise call center premises. It is understood that other storage options include a mixture of several locations for redundancy and archival purposes. Additionally data storage in a database can include defined rules/filters per enterprise call center (e.g., retention period, type, class, size, origin, destination, topic, etc.).

In step 520 the conversation thread token is passed to the call director 52 in the call center 50. In step 530 it is determined whether a customer service representative (CSR) has been designated to handle the customer message. If there is designated CSR, customer message is routed to the designated CSR in step 540. If there is no designated CSR, a CSR is designated to handle the conversation thread in step 550, the conversation thread token is updated to include the designated CSR information, and processing continues at step 540.

In one embodiment, the messaging hub 100 or call center 50 retains a SMS/MMS/EMS conversation thread for future messages for customer service representative (CSR) continuity and SMS/MMS/EMS message thread is displayed on a CSR screen. The messaging hub 100 assigns either a call center telephone number, a call center business name or a call center business product name to the CSR generated SMS/MMS/EMS message as an originating telephone number of the CSR generated SMS/MMS/EMS message.

In one embodiment, a conversation thread is switched back and forth from voice to SMS. In this embodiment the tracking token is established for each session linking the CSR (Customer Service Rep) with the customer, regardless of voice, SMS or web chat mechanisms, and provides the ability for the CSR and customer to exploit all available communications methods to stay within a conversation thread. On receipt of a voice call, the messaging hub 100 identifies a previous conversation thread and update the conversation thread token and history of the conversation thread to reflect that a voice call conversation.

In addition to communicating using voice, email, fax, IM/chat, a customer SMS message can be delivered to the designated CSR to a CSR workstation 53. An SMS/MMS function on the CSR workstation 53 is similar to any of the other communications methods on their display (voice, email, etc.), but, the CSR knows that the customer is using SMS/MMS messaging and handles the conversation accordingly (e.g., messages are limited to 160 characters per message). Also, similar to say, a voice session, any SMS/MMS message that the CSR sends out, will have the call center 8xx-xxx-xxxx number as the origin of the SMS message, regardless of which CSR is handling that particular SMS/MMS discussion thread.

In some embodiments, in addition to directing the SMS messages to the call center router 74 and onward to a PC, as a web application at the CSR workstation 53, a native application at the CSR workstation, a web application on a mobile network terminal, or an app on a mobile tablet or smartphone. The customer can use various mobile device (e.g., mobile devices (phones, tablets, etc.) either with a carrier SMS client or a custom application client running on a native OS (e.g., Apple iOS, Google Android, MSFT WinPhone, RIM Blackberry, etc.). In one embodiment, the SMS capability is seamlessly integrated into existing customer support consoles. The call center 50 includes the functional equivalent of an ACD (Auto Call Distributor) for routing of non-voice traffic such as emails, IM, web chat, etc. In one embodiment, the features described above are integrated into this ACD to provide and maintain the SMS message conversations in the conversation thread with the respective CSR on their screen in a window.

Other differences between SMS operation and conventional call center operation arise from the embedded URL links in either incoming or outgoing messages allows pictures and video to be sent as part of the message. Pictures or video may assist the CSR in diagnosis of a purchased product where multimedia content is available. Embedded URL links are processed in either incoming or outgoing messages by passing the links to the device operating system (OS) (whether mobile or PC) via built-in API's for URL handling. Typically the OS defaults to the device's browser to lookup the URL and render the URL.

In other embodiments, call center operations can provide customized mobile clients with branding and other unique features to help with diagnostics of their products. For example, a mobile phone manufacturer wants device information (such as IMEi, OS version, maintenance level, software applications installed, etc.) of the phone/tablet product that a customer is asking about, that the average customer might have a difficult time figuring out how to locate/determine this information.

Figure 6:
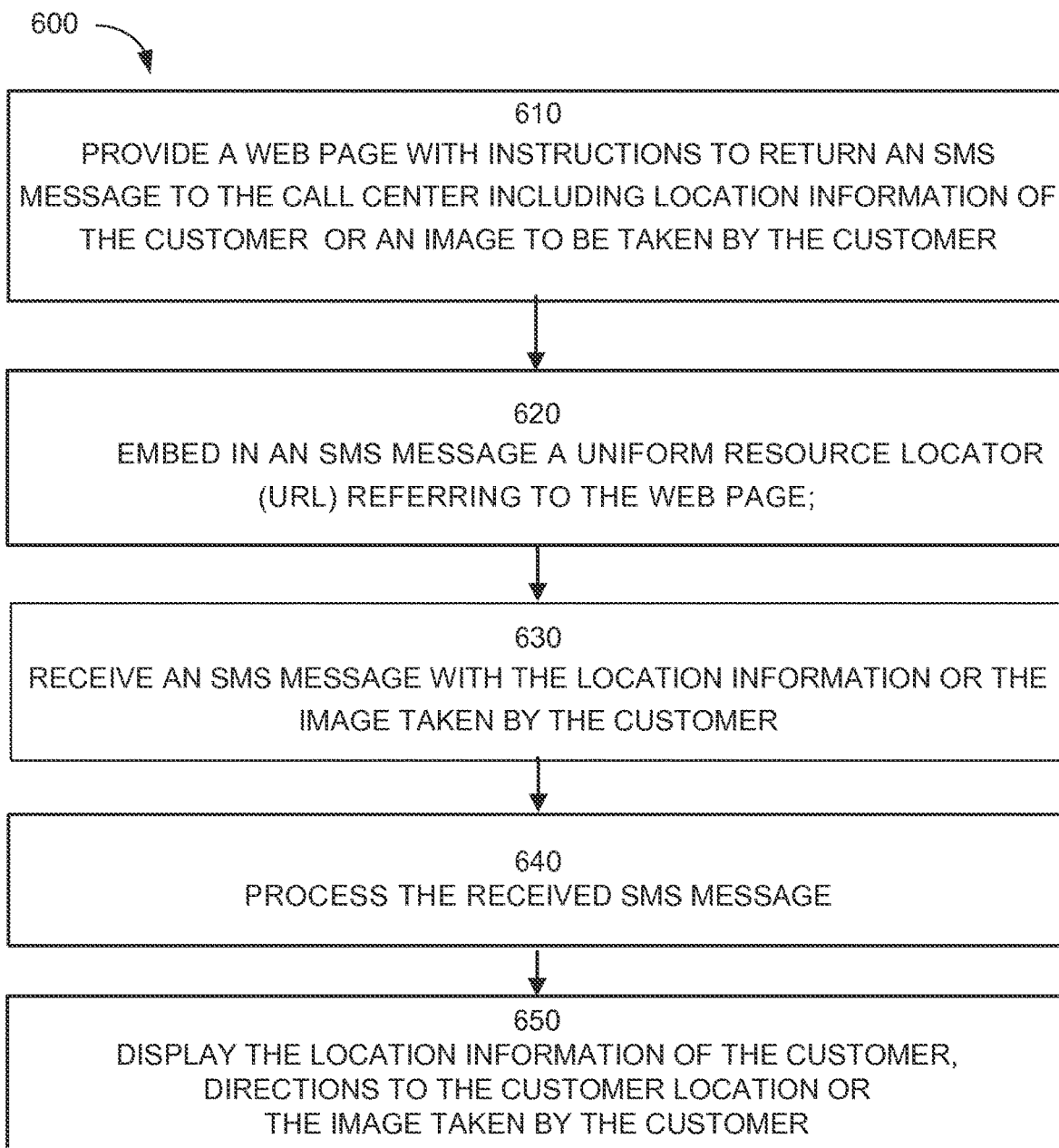
FIG. 6 is a flow chart of processing steps performed to capture and utilize a location of the customer by the call center of FIG. 1.

In another example, a call center 50 (including a government or municipal call center) would benefit from obtaining GPS or other machine derived geophysical coordinates of the customer/caller (Latitude/Longitude, etc.) which would assist in supporting the caller. In another example, the customer can take a picture and provide the image to the call center 50. For example a customer having a problem with a tire can send an image of the tire to the tire manufacturer call center which talking to or texting a CSR. Such information is automatically transmitted, for example, as part of a mobile app to the call center Representative as part of the SMS/MMS discussion, without the caller needing to do anything. In another embodiment without a special purpose app running on the customer's smart phone, the call center 50 sends an SMS message to a customer with a smartphone, and embedded in the SMS message is a uniform resource locator (URL) that the customer can select. FIG. 6, flowchart 600 diagrams the overall process of enabling the call center 50 to obtain location information from a customer communicating with the call center or alternatively enabling the call center 50 to obtain an image taken by the customer. In step 610, a web page is provided with instructions to return an SMS message to the call center including location information of the customer or an image to be taken by the customer. In step 620, a uniform resource locator (URL) referring to the web page is embedded in an SMS message and in step 630 an SMS message with the location information or the image taken by the customer is received. In step 640 the received SMS message is processed, and finally the location information or the customer, directions to the customer location or the image taken by the customer.

Figure 7:
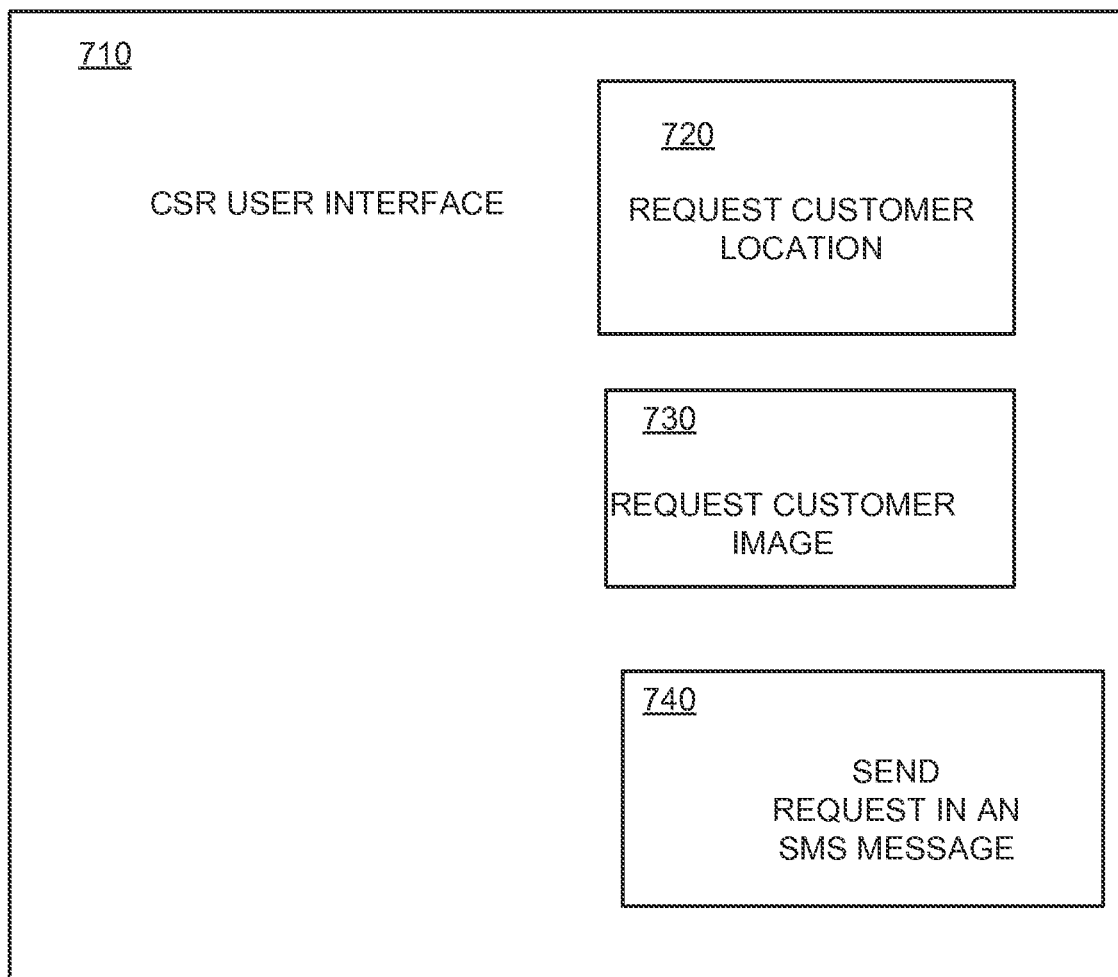
FIG. 7 is a screen shot of a portion of a user interface used by a CSR to request customer location or an image to be taken by the customer and returned to the call center of FIG. 1.

Now referring to FIG. 7, a screen shot of a portion of an exemplary user interface 710 is used by a CSR to request customer location or an image to be taken by the customer and returned to the call center 50. In operation, the CSR selects one or both of: a request for customer location information by selecting button 720 and a request that a customer take an picture to returned as an image back to the call center 50 by selecting button 730. After making a selection, the CSR sends and SMS message to the customer with the request(s) by selecting button 740.

In operation when a location information request is selected, the URL is controlled by messaging hub and the call center, and when the customer clicks on the URL and a function on the customer's phone is activated to look up the geographic location of the phone at that moment (latitude/longitude). The smartphone 31 sends the geographic location back in an SMS message to the call center 50. With this technique, the call center 50 can determine where the customer is located. The location information is particularly useful to call centers with a need to determine the customer's location (e.g., roadside assistance service, delivery services, etc).

Figure 8:
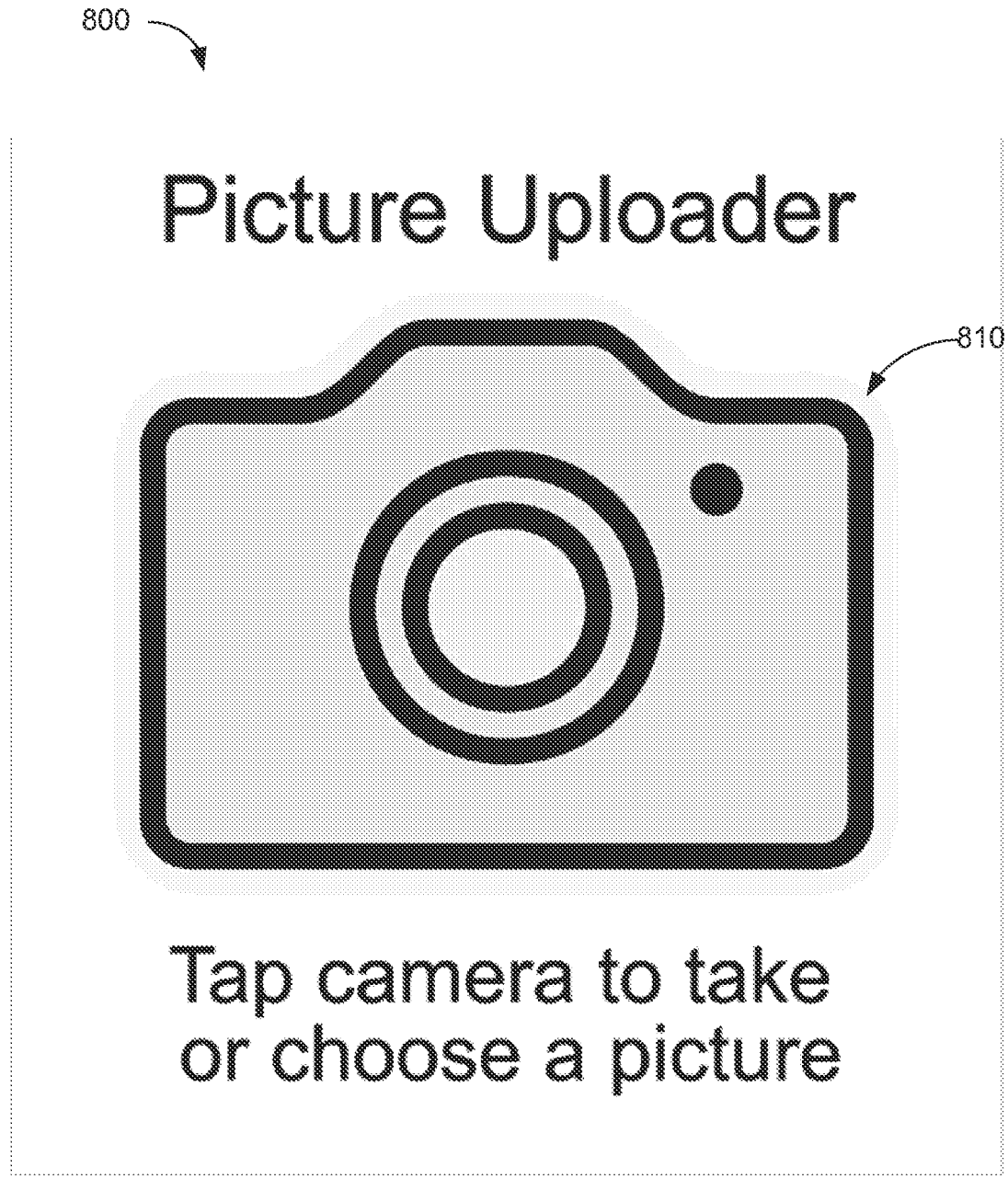
FIG. 8 is a screen shot of a portion of a web page displayed on a customer smart phone prompted the customer to take a picture which is returned to the call center of FIG. 1.

In operation after a request for the customer to take a picture is selected, the customer receives an SMS message with a URL to click on, which brings up web interface on mobile device browser (e.g., Safari or Chrome) and then the web page prompts the customer to click on camera' icon. After the customer clicks on the URL, a screen as depicted in FIG. 8 is displayed on the customer's smart phone. The customer is prompted to take a picture by clicking/pressing/selecting button 810, here a camera icon. The smartphone take a picture and the image is returned to the call center. In one embodiment, a Web program (instructions in a web page) in the smart phone browser activates the phone's camera and automatically uploads the image to servers in the messaging hub 100 for storage, management and distribution to the call center 50. This technique obviates the need for using MMS messaging which in some circumstances must be routed through cellular carrier equipment. It is understood that in addition to a smart phone, the customer can use a tablet, laptop, mobile device or any device with an internet connection or connection to a cellular carrier to contact the call center 50 and provide images or location information using SMS messaging.

Figure 9:
FIG. 9 is a screen shot of a portion of a web page displayed on a customer smart phone indicating that an image has been returned to the call center of FIG. 1.

FIG. 9 is a screen shot of a portion of a web page 900 displayed on a customer smart phone indicating that an image has been taken and is being sent to the call center 50. The web page 900 displays an indication 920 that the picture has been taken and displays a prompt 930 for the customer to take another picture by taping icon 910. It is noted that the above operations can be processed directly, without the request SMS message if the customer's smart phone is equipped with an app which can communicate directly with the messaging hub.

While configurations of the system and method have been particularly shown and described with references to configurations thereof, it will be understood by those skilled in the art that various changes in form and details may be made therein without departing from the scope of the invention. As an example, the order of processing steps in the flow charts is not limited to the order shown herein. Accordingly, the present invention is not limited by the example configurations provided above.

What is claimed is:

1. A computer-implemented method configured to enable a customer service system to communicate with a mobile device via electronic message communication, the method comprising:
   establishing a secure connection between an external platform and a customer service system;
   identifying a customer service system Short Message Service (SMS) enabled telephone number;
   provisioning, for electronic messaging, the customer service system SMS enabled telephone number into at least one industry white list for exception processing of customer service system characteristic traffic patterns;
   receiving an electronic message from the mobile device directed to the customer service system SMS enabled telephone number, routed through a mobile device carrier of the mobile device, through the external platform to the customer service system;
   providing delivery of the electronic message from the mobile device to a customer service representative (CSR) workstation of the customer service system;
   providing a communications channel to and interfacing with a customer service system routing switch; and
   providing a user-interface window on a CSR screen that enables an interface to electronic message threads directed through the customer service system routing switch.

2. The method of claim 1, wherein identifying the customer service system SMS enabled telephone number includes determining one of a toll-free customer service system SMS enabled telephone number and a non-toll-free customer service system SMS enabled telephone number.

3. The method of claim 1, wherein provisioning the customer service system SMS enabled telephone number further includes:
   provisioning the customer service system SMS enabled telephone number with industry and carrier database directories with routing information including at least one of:
      an origin;
      a destination;
      an IP address;
      a network ID; and
      an entity ID;
   provisioning the customer service system SMS enabled telephone number into and external platform database directory and servers to act as host, storage and router of the customer service system SMS enabled telephone number; and
   provisioning the customer service system SMS enabled telephone number into industry registration directory databases with associated entity information.

4. The method of claim 3, further comprising establishing interconnections between the external platform and a global SMS infrastructure for routing of the electronic messages.

5. The method of claim 1, further comprising providing an interface between customer service system operations and the mobile device by providing a one of a direct to PC application, a web application, and a native application to one of send and receive electronic messages.

6. The method of claim 5, further comprising providing a client application on the mobile device to communicate with the customer service system using the electronic messaging communication, wherein the electronic messages are routed via the external platform.

7. The method of claim 1, further comprising:
   retaining an electronic conversation thread for future messages for CSR continuity;
   displaying an electronic message conversation thread on a CSR screen; and
   assigning one of the customer service system SMS enabled telephone number, a customer service system business name, a customer service system business product name on a CSR generated electronic message as an originating telephone number of the CSR generated electronic message.

8. A computer-implemented method configured to enable a customer service system to communicate with a customer via electronic message communication, the method comprising:
   identifying a customer service system telephone number;
   provisioning the customer service system telephone number, the provisioning comprising:
      provisioning the customer service system telephone number including routing information into a carrier database directory;
      provisioning the customer service system telephone number into a database directory of an external platform; and
      provisioning the customer service system telephone number into an industry registration directory database;
   establishing an interconnection between the external platform and one of a message mobile aggregator and a mobile carrier for message routing;
   establishing a secure connection between the external platform and a call director of the customer service system;
   receiving a customer message directed to the customer service system telephone number routed through a mobile device carrier of the mobile device, through a global Short Message Service (SMS) network and through the external platform to the customer service system;
   determining whether the received customer message is starting a new conversation;
   in response to determining that there is the started new conversation, creating a conversation thread and a corresponding conversation thread token;
   passing the corresponding conversation thread token to the call director of the customer service system; and providing delivery of the electronic message from the mobile device to a customer service representative (CSR) workstation of the customer service system.

9. The computer-implemented method of claim 8, further comprising:
receiving the customer message in the call director of the customer service system;
determining there is no designated CSR workstation to receive the customer message; and
in response to determining that there is no designated CSR workstation:
designating a CSR workstation to handle the conversation thread;
updating the corresponding conversation thread token; and
routing the customer message to the designated CSR workstation.

10. The computer-implemented method of claim 8, further comprising:
switching the conversation thread between one of voice communication and electronic messaging to an other of voice communication and electronic messaging.

11. The computer-implemented method of claim 9, further comprising:
storing an electronic message, message time data, and token information including the designated CSR workstation for a portion of the conversation thread.

12. The computer-implemented method of claim 8, further comprising:
providing a web page with instructions requesting the customer via the mobile device to return an electronic message to the customer service system including customer location information;
embedding in the electronic message a uniform resource locator (URL) referring to the web page; and
receiving the electronic message with the customer location information of the customer as entered by the customer.

13. The computer-implemented method of claim 12, further comprising:
processing the received SMS message; and
displaying one of:
the customer location information as supplied by the customer; and
directions to the customer location.

14. A computer-implemented method configured to enable a customer service system to communicate with a mobile device via electronic message communication, the method comprising:
provisioning a customer service system telephone number for electronic messaging, the provisioning comprising:
registering the customer service system telephone number with an external platform having access to a Short Message Service Center (SMSC);
registering the customer service system telephone number in a database accessible by the SMSC with access to a global SMS network;
establishing a secure connection to the external platform;
receiving a customer message including a conversation thread token from a mobile device directed to the customer service system telephone number, routed through a mobile device carrier of the mobile device, through the global SMS network and through the external platform to the customer service system;
determining there is no designated customer service representative (CSR) workstation for the received electronic message, and in response, designating a CSR workstation to handle a conversation thread;
updating a corresponding conversation thread token with the designated CSR workstation; and
routing the customer message to the designated CSR workstation based on the updated conversation thread token,
wherein the telephone number is a published operational customer service system telephone number.

15. The computer-implemented method of claim 14, further comprising:
in response to determining that there is a designated CSR workstation, routing the customer message to the designated CSR workstation.

16. The computer-implemented method of claim 15, further comprising switching the conversation thread between one of a voice communication and an electronic messaging as selected by the designated CSR workstation.

17. The computer-implemented method of claim 14, further comprising:
receiving a voice call;
identifying a previous conversation thread; and
updating the conversation thread token to reflect a voice conversation.

18. The computer-implemented method of claim 8, further comprising:
providing a web page with instructions requesting the customer to return an electronic message to the customer service system including an image to be taken by the customer;
embedding in an electronic message a uniform resource locator (URL) referring to the web page; and
receiving the electronic message with the image taken by the customer.

19. The computer-implemented method of claim 18, further comprising:
processing the received electronic message;
retrieving the image; and
displaying the image taken by the customer.

20. The computer-implemented method of claim 1, further comprising obtaining a Letter of Authorization (*LOA*) to utilize an existing telephone number for an electronic messaging purpose before provisioning the existing telephone number,
wherein the existing telephone number is a published operational customer service system telephone number.

21. The computer-implemented method of claim 1, wherein the external platform further comprises a unified messaging service, and the method further comprising connecting to third party messaging gateways.

22. The computer-implemented method of claim 1, wherein the electronic message comprises a live-texting message.

23. The computer-implemented method of claim 1, wherein providing delivery of the electronic message from the mobile device to the CSR workstation of the customer service system further provides an ability to live chat via a two-way messaging application.

24. The computer-implemented method of claim 1, wherein providing delivery of the electronic message from the mobile device to the CSR workstation of the customer service system further provides ability to secure routing of all messaging channels across different networks.

25. The computer-implemented method of claim 1, wherein providing delivery of the electronic message from the mobile device to the CSR workstation of the customer service system further provides seamless integration into an existing agent console.

26. The computer-implemented method of claim 1, wherein providing delivery of the electronic message from the mobile device to the CSR workstation of the customer service system further provides integration of conversations occurring on various messaging platforms into a customer service system.

27. The computer-implemented method of claim 1, wherein providing delivery of the electronic message from the mobile device to the CSR workstation of the customer service system further provides routing of messages to chat server queues when customer service agents can pick them up.

28. The computer-implemented method of claim 1, wherein providing delivery of the electronic message from the mobile device to the CSR workstation of the customer service system further provides native integration for third party messaging platforms.

29. The computer-implemented method of claim 1, wherein providing delivery of the electronic message from the mobile device to the CSR workstation of the customer service system further provides receiving customer questions and issuing corresponding responses over a customer preferred messaging channel.

30. The computer-implemented method of claim 1, wherein providing delivery of the electronic message from the mobile device to the CSR workstation of the customer service system further provides support for text, pictures, videos, emojis and stickers.

\* \* \* \* \*